(12) United States Patent
Olien

(10) Patent No.: US 9,482,252 B2
(45) Date of Patent: Nov. 1, 2016

(54) MOUNTING DEVICE AND METHOD

(71) Applicant: Michael A. Olien, Tomball, TX (US)

(72) Inventor: Michael A. Olien, Tomball, TX (US)

(*) Notice: Subject to any disclaimer, the term of this patent is extended or adjusted under 35 U.S.C. 154(b) by 630 days.

(21) Appl. No.: 13/894,363

(22) Filed: May 14, 2013

(65) Prior Publication Data

US 2013/0333267 A1 Dec. 19, 2013

Related U.S. Application Data

(60) Provisional application No. 61/646,575, filed on May 14, 2012.

(51) Int. Cl.
*A01M 31/06* (2006.01)
*F16B 2/20* (2006.01)
(52) U.S. Cl.
CPC ............. *F16B 2/20* (2013.01); *A01M 31/06* (2013.01); *Y10T 24/44051* (2015.01); *Y10T 24/44615* (2015.01)

(58) Field of Classification Search
CPC ...................................................... A01M 31/06
USPC ............................................................ 43/2, 3
See application file for complete search history.

(56) References Cited

U.S. PATENT DOCUMENTS 6,493,980 B1 * 12/2002 Richardson et al. ............... 43/3
2010/0215355 A1 * 8/2010 Olien ............................ 396/428

* cited by examiner

*Primary Examiner* — Christopher P Ellis
(74) *Attorney, Agent, or Firm* — Buche & Associates, P.C.; John K. Buche; Scott D. Compton

(57) ABSTRACT

Disclosed is a device for mounting hunting decoys, bird deterrents, trail cameras, and the like to support surfaces. Also disclosed is a mounting device having a mating surface for receiving a hunting decoy therein, the mating surface being operationally configured to allow rotation of the hunting decoy about the mounting device up to about 360 degrees.

7 Claims, 10 Drawing Sheets

MOUNTING DEVICE AND METHOD

CROSS-REFERENCE TO RELATED APPLICATIONS

This application claims the benefit of U.S. Prov. Pat. App. No. 61/646,575 (filed May 14, 2013). Said document is incorporated by reference in its entirety.

STATEMENT REGARDING FEDERALLY SPONSORED RESEARCH OR DEVELOPMENT

Not applicable.

FIELD OF THE APPLICATION

The application relates generally to mounting type devices used in connection with hunting decoys including wild fowl decoys.

BACKGROUND

Known wild fowl decoys are attached to support structures via a clip type device or a square peg extending from the bottom side of the decoy, the peg mating with the open end of a square support post. In either situation, the decoy is committed to facing in a single direction as determined by the person(s) setting up the decoy. As understood by persons of ordinary skill in the art of wild fowl hunting, birds normally land into the wind, whereby a bird will circle around until it is flying into the wind before making its landing approach. If the direction of a bird into the wind is different than the direction of the decoy, then the decoy will not appear to be a live bird.

A decoy that can rotate, move, or otherwise face into the wind during use is desirable.

BRIEF DESCRIPTION

Figure 1:
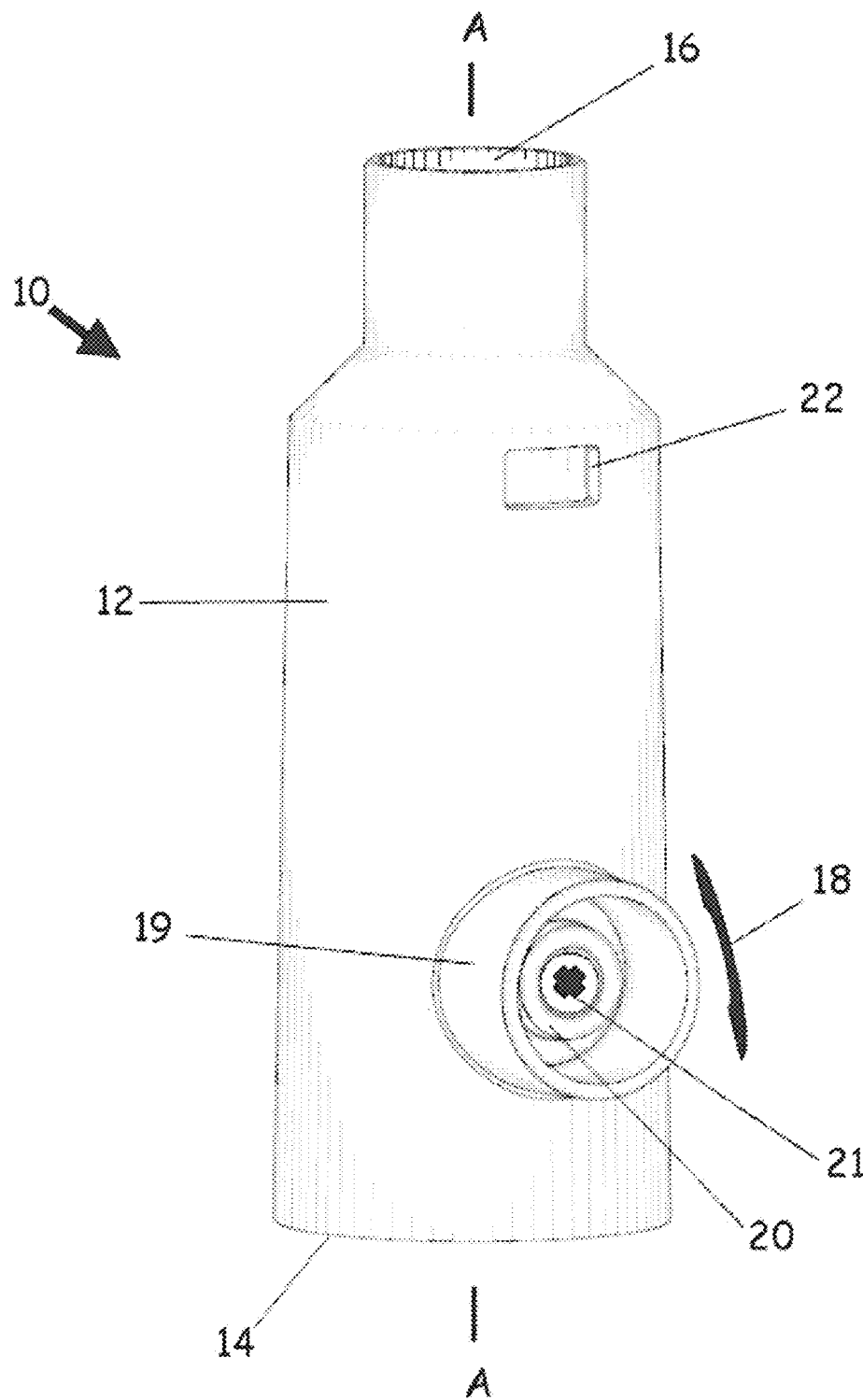
FIG. 1 is a front perspective view of an embodiment of the mounting device.

It has been discovered that a device for mounting hunting decoys to support surfaces may be provided in a manner to enhance the life like characteristics of the decoy beyond the decoy manufacturer specifications. Heretofore, such a desirable achievement has not been considered possible, and accordingly, the system and method of this application measure up to the dignity of patentability and therefore represents a patentable concept.

Before describing the invention in detail, it is to be understood that the present system and method are not limited to particular embodiments. It is also to be understood that the terminology used herein is for the purpose of describing particular embodiments only, and is not intended to be limiting. As used in this specification and the appended claims, the term "T-post" refers to a steel fence post typically driven into the ground and operationally configured to support wire or wire mesh. The phrase "pre-existing T-post" refers to a T-post driven into the ground for use prior to serving as a support structure for the mounting device of this application. For the purposes of this application, the term "decoy" may include hunting decoys including, but not necessarily limited to wild fowl decoys, and bird deterrents. Herein, the phrase "wild fowl" may refer to one or more game birds including, but not necessarily limited to ducks, geese, swan, pheasants, dove, quail, American Woodcock, pigeons, Wilson' Snipes, chickens, ptarmigans, turkeys, Northern Bobwhites, Rails, the American Coot, cranes, partridges, grouse, plovers, and other migratory type birds.

In one aspect, the application provides a mounting device releasable securable to a multi-sided post or similar support structure, the mounting device being operationally configured to receive a hunting decoy such as a wild fowl decoy. Suitably, the mounting device may be built to scale as desired.

In another aspect, the application provides a mounting device releasable securable to a round post or similar support structure, the mounting device being operationally configured to receive a hunting decoy such as a wild fowl decoy.

In another aspect, the application provides a mounting device releasable securable to an irregular shaped post or similar support structure, the mounting device being operationally configured to receive a hunting decoy such as a wild fowl decoy.

In another aspect, the application provides a mounting device releasable securable to T-post or similar support structure, the mounting device being operationally configured to receive a hunting decoy such as a wild fowl decoy.

In another aspect, the application provides a mounting device releasable securable to U-post or similar support structure, the mounting device being operationally configured to receive a hunting decoy such as a wild fowl decoy.

In another aspect, the application provides a mounting device releasable securable to Y-post or similar support structure, the mounting device being operationally configured to receive a hunting decoy such as a wild fowl decoy.

In another aspect, the application provides a mounting device releasable securable to star post or similar support structure, the mounting device being operationally configured to receive a hunting decoy such as a wild fowl decoy.

In another aspect, the application provides a mounting device releasably clippable to a support structure as desired, the mounting device being operationally configured to receive a hunting decoy such as a wild fowl decoy.

In another aspect, the application provides a mounting device operationally configured to receive a hunting type trail camera releasably attached thereto. In one embodiment, the mounting device may be releasably secured to a pre-existing T-post in a manner effective to further secure the trail camera to the T-post during use.

In another aspect, the application provides a tamper proof mounting device for securing the mounting device to a support structure such as a post or similar structure. The tamper proof mounting device requiring a particular tool for release of the mounting device from the support structure.

In another aspect, the application provides a mounting device releasably securable to a post or similar support structure, the mounting device being effective to (1) receive a hunting decoy attached thereto, and (2) maintain the front of the decoy directionally facing the wind, if any.

In another aspect, the application provides a mounting device operationally configured to receive one or more motorized wild fowl decoys.

In another aspect, the application provides a mounting device operationally configured to maintain a wild fowl decoy in a substantially upright position during operation.

In another aspect, the application provides a mounting device including a female type opening at a first end operationally configured to mate with the distal end of a pre-existing post, and a female type mating member at the opposing end operationally configured to receive a male type decoy peg therein.

In another aspect, the application provides a mounting device operationally configured to receive a hunting type trail camera releasably attached thereto. In one embodiment, the mounting device may be releasably secured to a T-post in an open field in a manner effective to secure the trail camera to the T-post during use.

In another aspect, the application provides a mounting device having a mating surface for receiving a hunting decoy therein, the mating surface being operationally configured to allow rotation of the hunting decoy about the mounting device up to about 360 degrees.

DISCUSSION OF THE DEVICE AND METHOD

Reference will now be made in detail to embodiments, examples of which are illustrated in the accompanying drawings. In the following detailed description, numerous specific details are set forth in discussing the present mounting device and method. However, it will be apparent to one of ordinary skill in the art that the present invention may be practiced without various specific details. With reference now to the simplified illustration of FIG. 1, a mounting device 10 is provided having an elongated body defined by a longitudinal axis A-A, an outer surface 12, a first mating surface 14, and a second mating surface 16. As further shown, the mounting device 10 may further include a tamper proof lock 18 operationally configured to secure the mounting device 10 to a support structure such as a post 100, pole, and the like. As shown, the tamper proof lock 18 may be provided in the form of an assembly including a first outer guard 19 extending from the outer surface 12 defining a continuous wall type perimeter. The tamper proof lock 18 further includes a second inner guard 20 defined by an aperture there through for receiving a security fastener 21 that may be biased against a post, pole, or similar support structure housed within the mounting device 10 via the first mating surface 14 in a manner effective for securing the mounting device 10 to the post.

The security fastener 21 represents a biasing means aspect of the tamper proof lock 18. Although not necessarily limited to a particular embodiment, a suitable security fastener 21 may be defined by an article having a longitudinal axis and a mating head operationally configured to receive a corresponding tool for tightening/loosening the security fastener 21 against a post or similar support structure. For example, the security fastener 21 may include a bolt, pin, screw, or like device having a cavity head or other head configuration for receiving a particular tool. In a particularly advantageous embodiment, a specialized security fastener 21 may be employed requiring a particular tool to tighten/loosen the security fastener 21. Suitable specialized security fasteners 21 include, but are not necessarily limited to tamper proof screws such as snake eyes spanner screws, Phillips head pin screws, torx pin head screws, tri-wing screws, triangular screws, hex socket drive screws, pan head screws, flat head screws, button head screws, and socket pin-head screws. In a particularly advantageous embodiment, the security fastener 21 includes a pan head hex pin requiring a hex bit tip with bit tip insert or hand driver to operate. Suitable specialized security fasteners 21 may be constructed from metals including for example brass, carbon steel, stainless steel, alloy steel.

Figure 2:
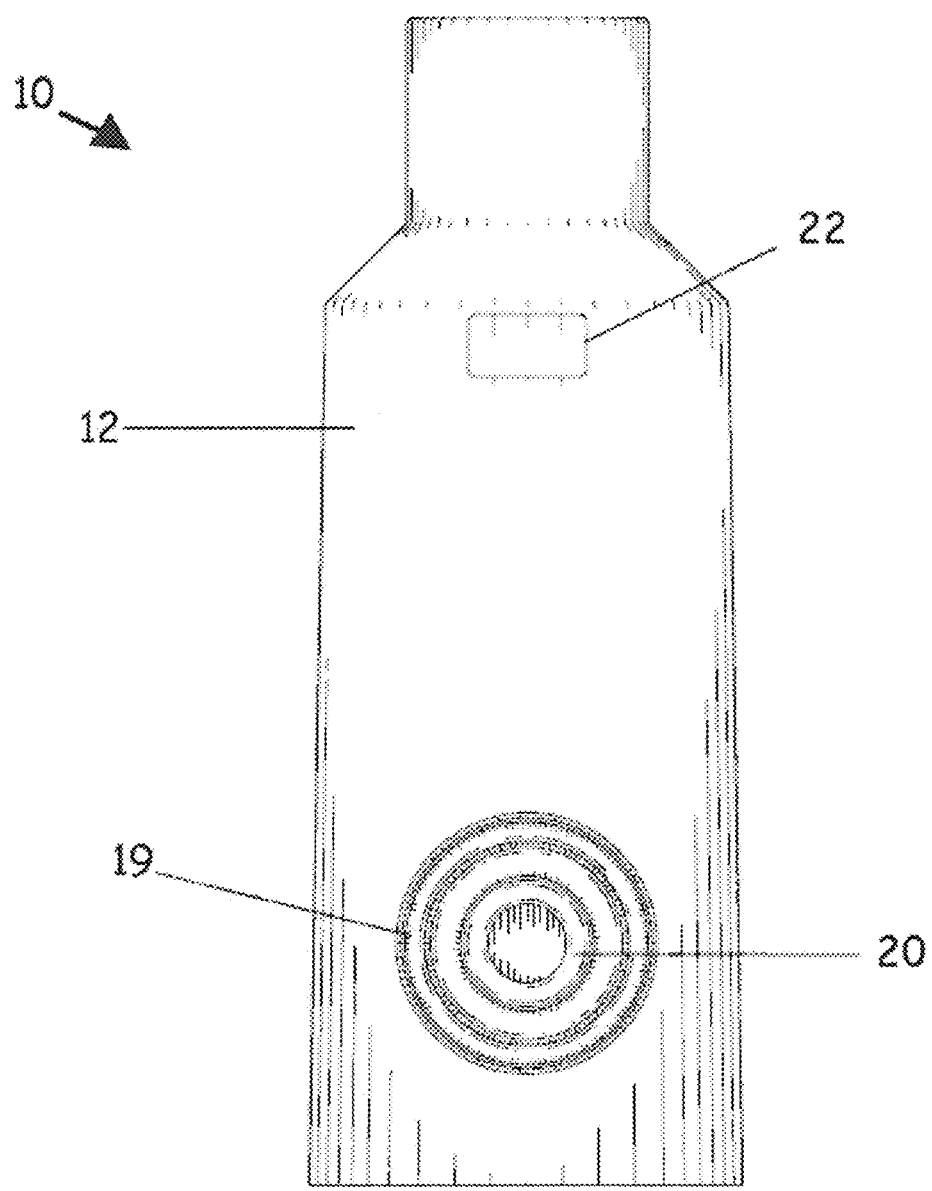
FIG. 2 is a front elevational view of an embodiment of the mounting device.
Figure 3:
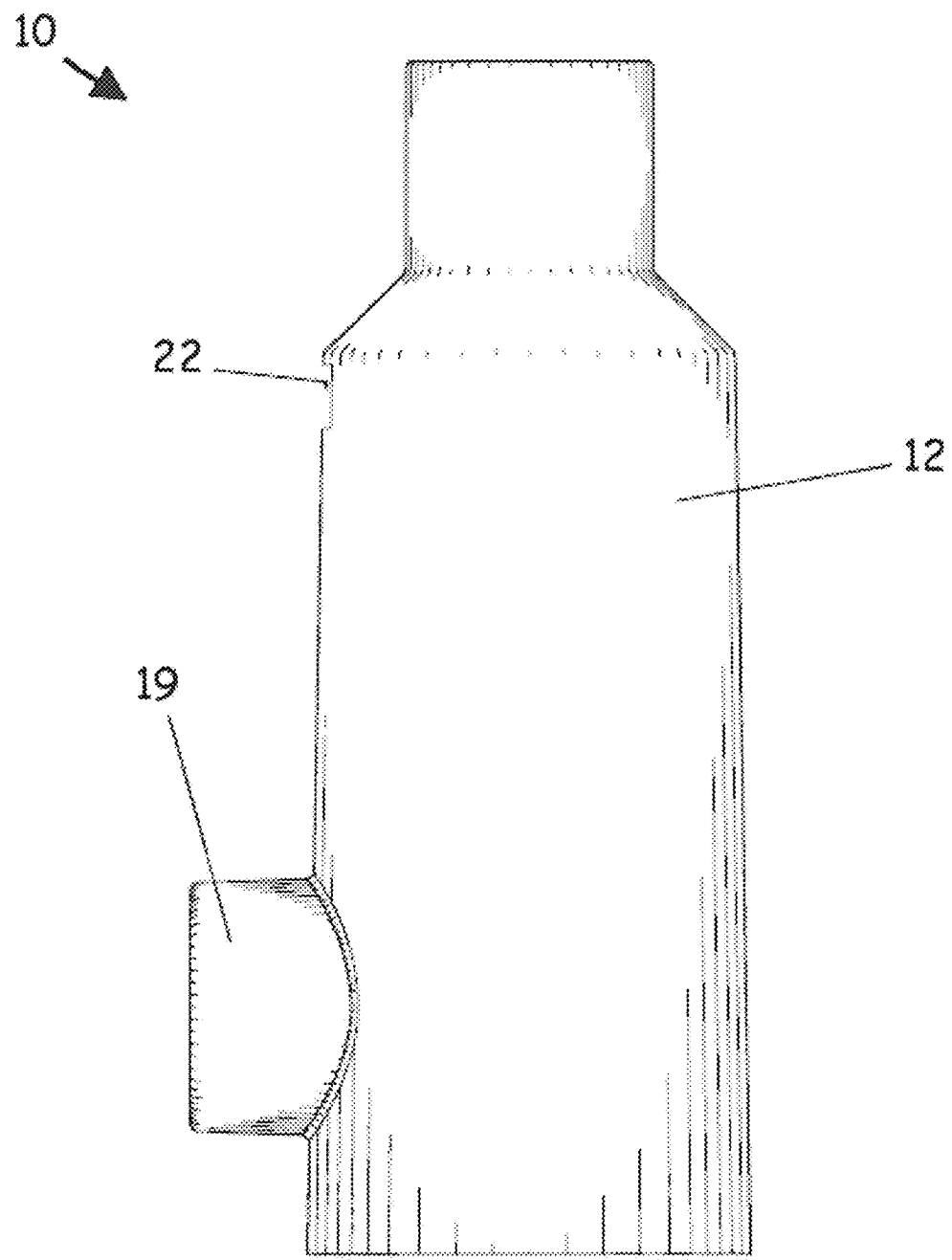
FIG. 3 is a left side elevational view of an embodiment of the mounting device.

During operation, the security fastener 21 may be directed through the aperture of the second inner guard 20 to a sunk position clear of the outer surface of the inner guard 20. As such embodiment, the outer edge or head of the security fastener 21 is surrounded by both the outer guard 19 and inner guard 20 restricting access to the security fastener 21 from the side. In operation, the outer guard 19 and inner guard 20 are operationally configured to prevent unauthorized access to the security fastener 21. Although not necessarily limited to a particular configuration, the outer guard 19 and inner guard 20 are circular type perimeters defined by a longitudinal axis substantially perpendicular to the longitudinal axis A-A of the mounting device 10 (see FIGS. 2 and 3).

In absence of the outer guard 19 and/or inner guard 20, the security fastener 21 (even a specialized security fastener) may be subject to manipulation from its side via commercially available tools or instruments, including but not necessarily limited to wrenches, pliers, screw drivers, hammers, chisels, files, pocket knifes, and the like. Thus, the outer guard 19 and inner guard 20 are suitable for securing the mounting device 10 where potential thieves and vandals are likely to stumble upon such items in secluded areas where such persons are less likely to be carrying specialized tools designed to work with a specialized security fastener 21.

Figure 4:
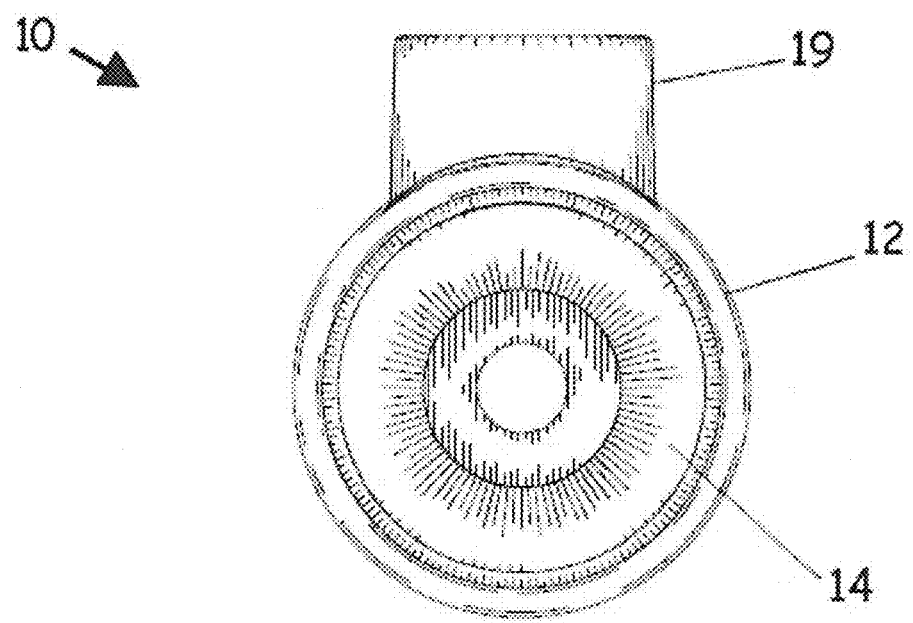
FIG. 4 is a bottom view of an embodiment of the mounting device.

With reference to FIG. 4, the first mating surface 14 may be defined as a female type mating surface operationally configured to receive a post, pole, or other longitudinal type structure therein. As shown, the first mating surface 14 may include a circular type inner surface tapering inward and gradually decreasing in inner diameter within the mating surface 14. In another embodiment, the mating surface 14 may include a cylindrical inner surface including a constant inner diameter. In still another embodiment, the mating surface 14 may include a shape operationally configured to mate with a particular shaped post, pole, or other support structure. For example, in an embodiment where the mounting device 10 is to be secured to a T-post, the mating surface 14 may include an "H" shape, or a "T" shape for receiving the T-post therein. Regardless of the inner surface incorporated, a suitable mating surface 14 is operationally configured to maintain a stable and/or static position of the mounting device 10 in contact with a corresponding support structure.

Figure 5:
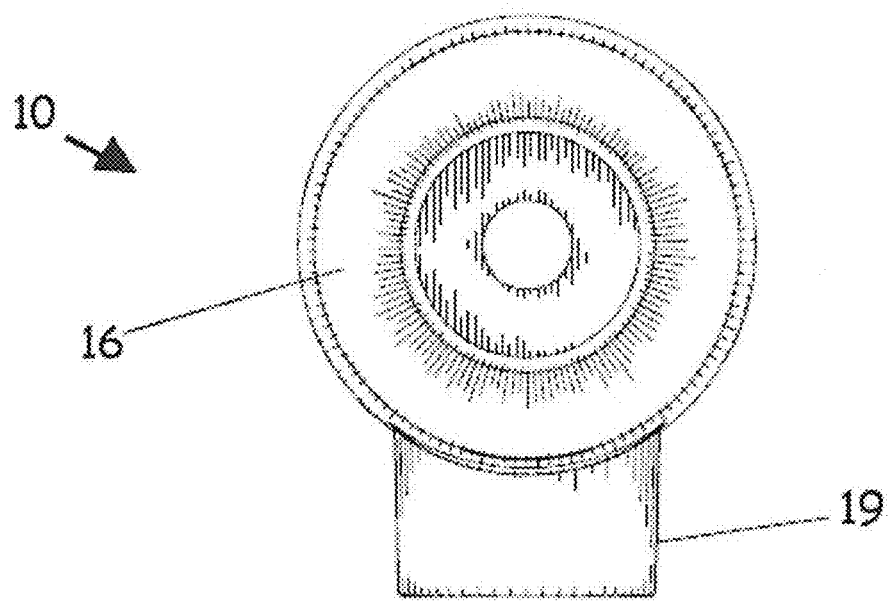
FIG. 5 is a top view of an embodiment of the mounting device.
Figure 6:
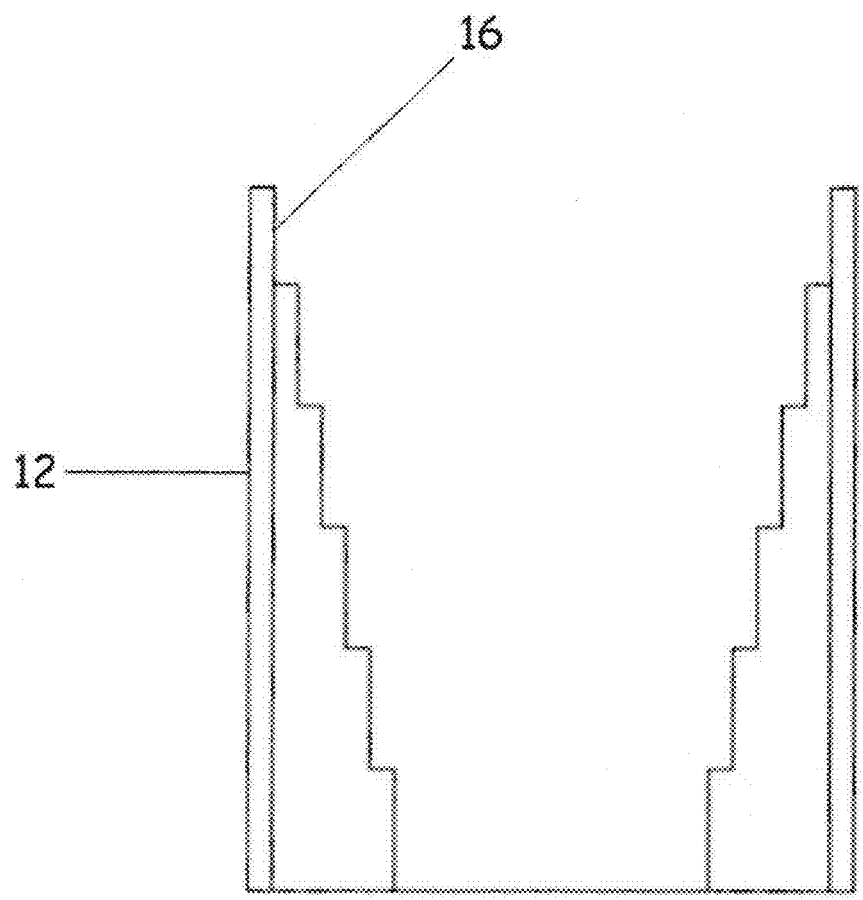
FIG. 6 is a sectional view of a second mating surface of the mounting device, the mating surface having a stepped inner surface.

With reference to FIG. 5, the second mating surface 16 may include a circular type inner surface tapering inward and gradually decreasing in inner diameter. In another embodiment, the inner surface of the second mating surface 16 may include a stepped inner surface comprised of two or more vertical surfaces and two or more horizontal surfaces defining a stepped configuration on the inner surface of the mating surface 16 (see FIG. 6).

Figure 7:
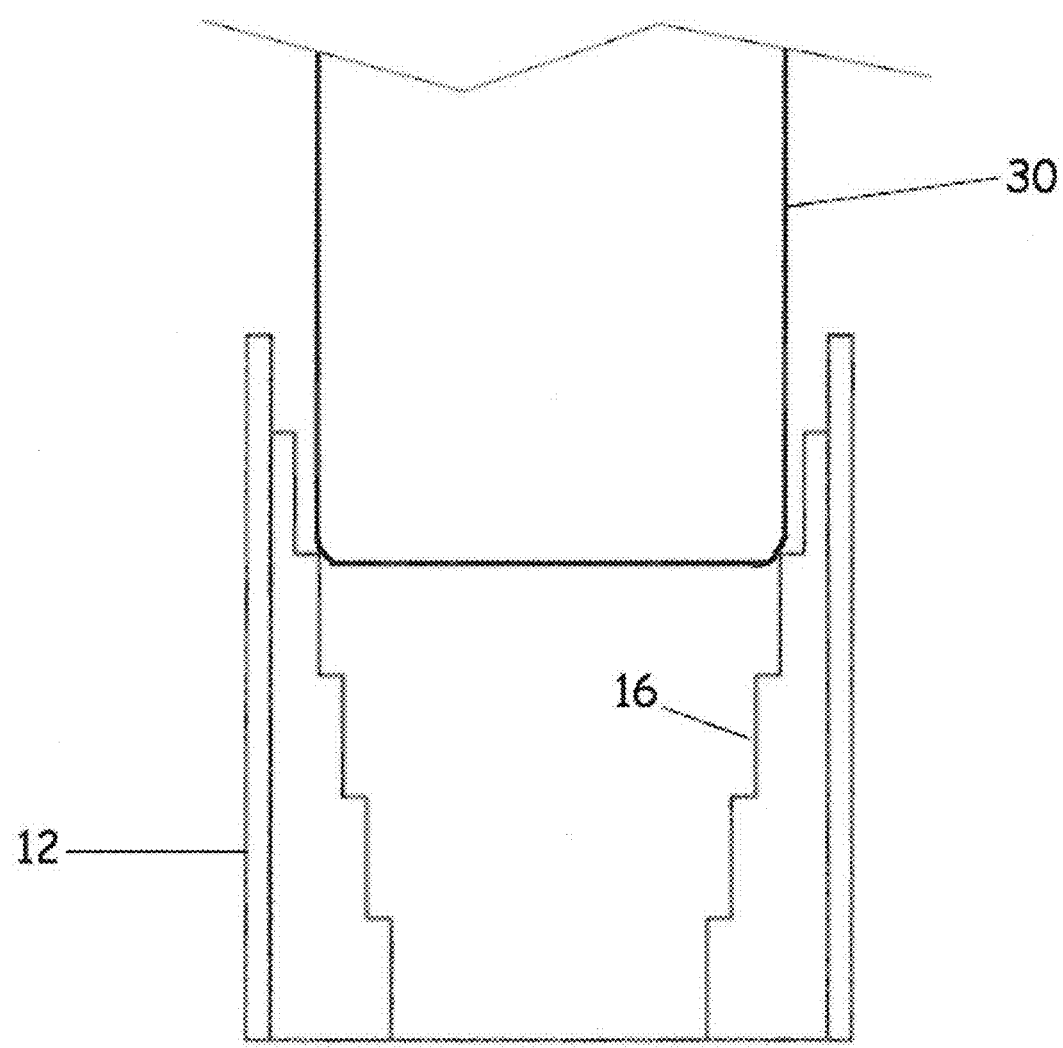
FIG. 7 is a sectional view of the second mating surface of FIG. 6, the second mating surface supporting a decoy peg therein.

Turning to FIG. 7, a second mating surface 16 having a stepped inner surface is operationally configured to receive one or more commercially available hunting decoys therein. One suitable commercial source of hunting decoys, as of the date of this application, includes Huntwise, Inc., a.k.a., MOJO Outdoors®, having an address of 623 Highway 594, Monroe, La. 71203-8005, maker of the MOJO Mallard®, amongst other waterfowling decoy products. MOJO type decoys include a square peg 30 extending from the bottom side of the decoy 50 (see FIG. 8), the edges of which are rounded off. As shown in FIG. 7, the second mating surface 16 is operationally configured to support pegs 30 of varying outer widths—the narrower the peg 30 the deeper the peg 30 rests within the mounting device 10 against a step of the mating surface 16.

As FIG. 7 further illustrates, (1) the stepped configuration on the inner surface of the mating surface 16 and (2) the rounded edges of the peg 30, are operationally configured to minimize the contact surface between the mating surface 16 and the peg 30. Minimization of the contact surface is effective to minimize the amount of surface friction between the peg 30 and mating surface 16, thus allowing the decoy 50 to rotate about the mounting device 10 upon effects of gravity, wind, physical contact by wildlife and insects, and combinations thereof. To further reduce possible surface friction, the mounting device 10 may be made from one or more chemical compositions comprising one or more friction reducing agents. By way of example and not of limitation, friction reducing agents may include waxes, oils, graphite, molybdenum disulfide, polytetrafluoroethylene ("PTFE"), talc, and various blends of the above.

In one mode of operation, by sampling orienting the wings of a wild fowl decoy 50 in a non-parallel fashion the friction reduction provided by the mating surface 16 may be effective to allow the decoy 50 to rotate based on gravity until reaching equilibrium, e.g., in a controlled environment. In another operation, as wind passes a MOJO style decoy 50, the shape of the decoy 50, and the mounting point of the peg 30 extending from the decoy 50 are effective to allow the decoy 50 to rotate about the mounting device 10 in a manner to face forward toward the oncoming wind maximizing the decoying effect when attempting to attract particular birds to the decoy 50. In another embodiment including a decoy 50 having motorized spinning wings, the friction reduction provided by the mating surface 16 may be effective to allow the decoy 50 to rotate about the mounting device 10 based on vibration of the peg 30 caused by wing spin.

Figure 10:
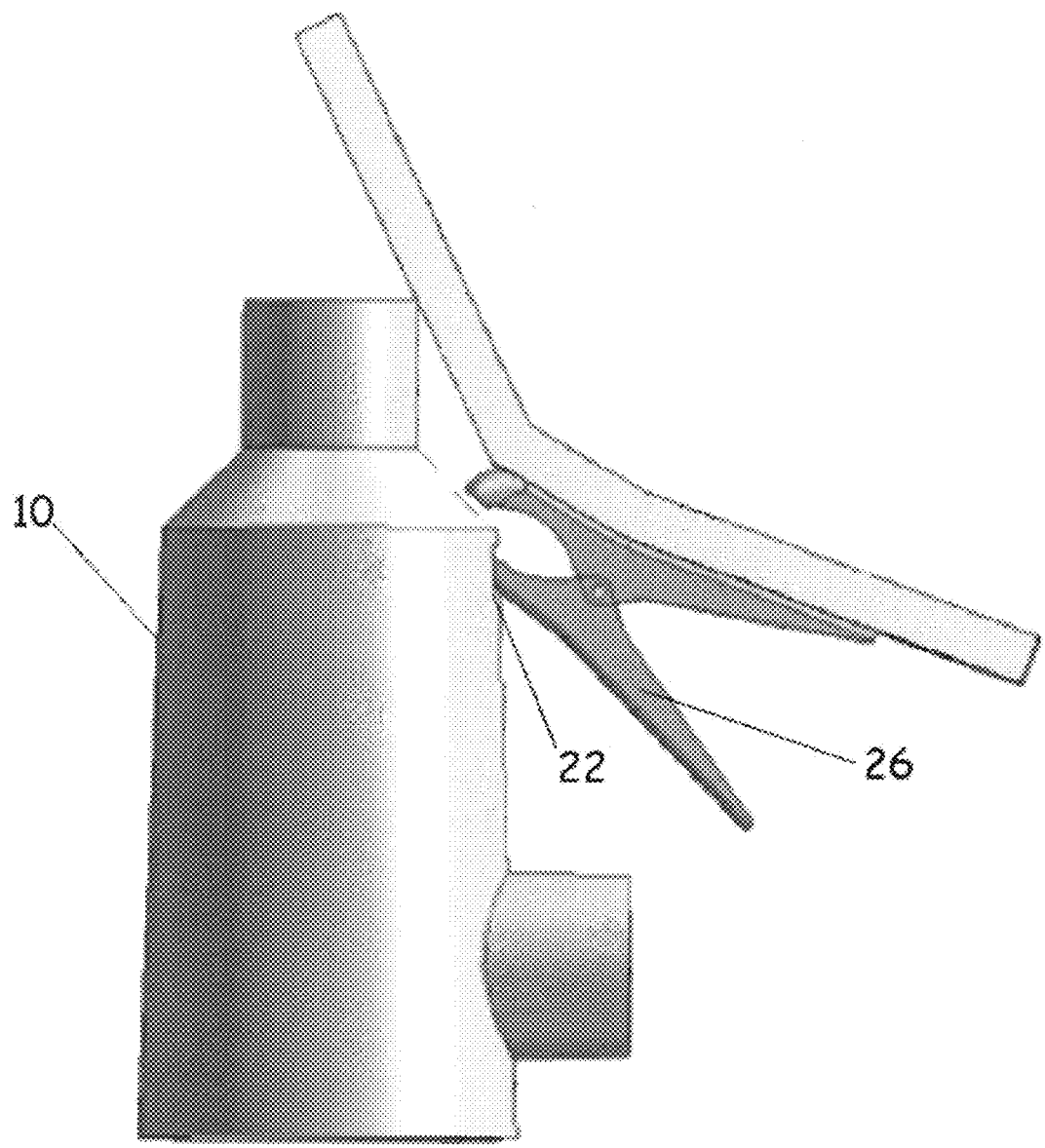
FIG. 10 is an embodiment of the mounting device including a clothespin and partial decoy attached thereto.
Figure 11:
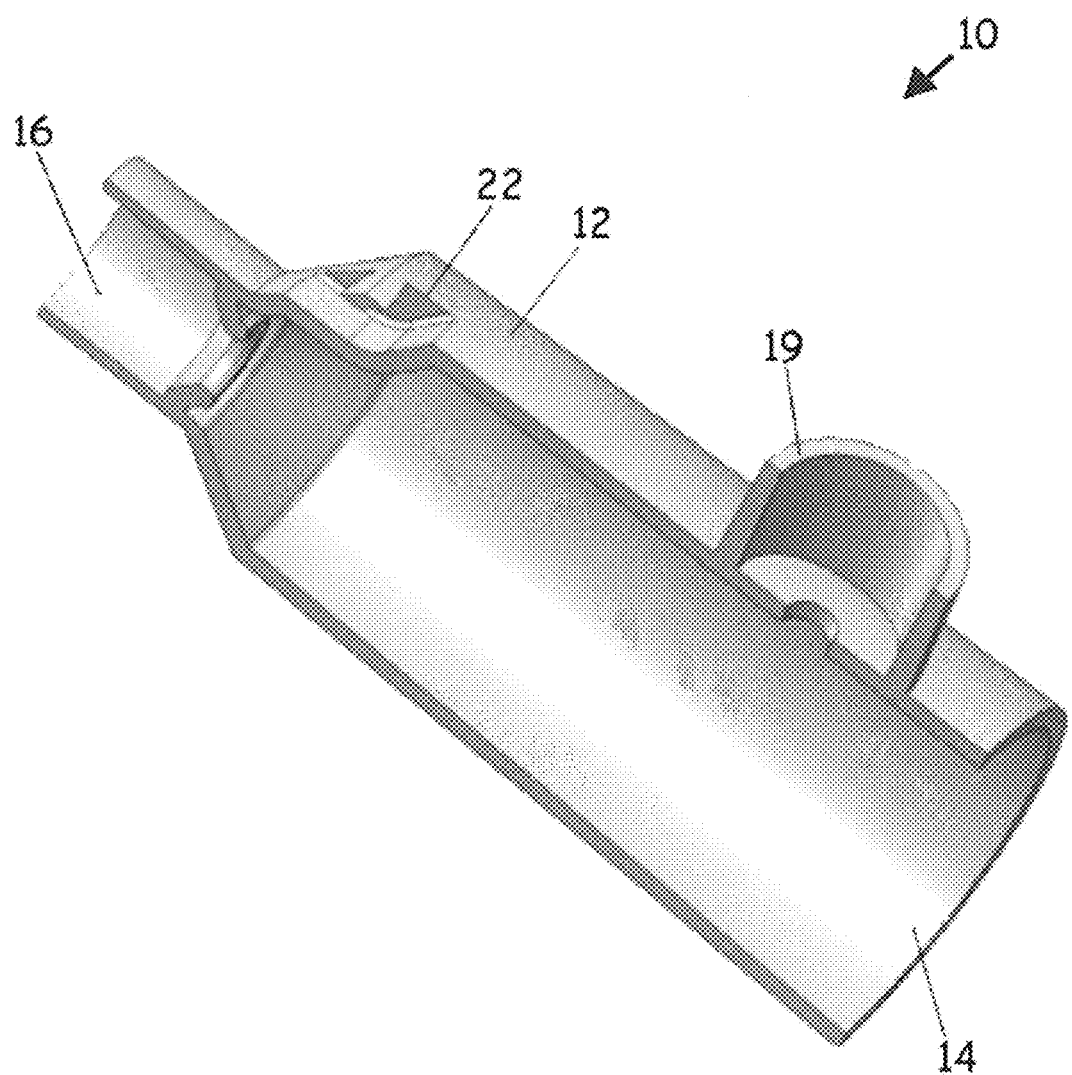
FIG. 11 is a sectional view of an embodiment of the mounting device.

Referring again to FIG. 1, the mounting device 10 may further include a clip slot 22 operationally configured to receive an attachment clip such as a dowel pin, spring pin, metal clothespin and the like for securing a decoy to the mounting device 10. One commercially available decoy for attaching to the mounting device via the clip slot 22 is provided by the company Edge by Expedite, having an address of 1201 Beaudry Blvd., Hudson, Wis. 54016. An example of a clothespin 26 attachment via clip slot 22 is provided in FIG. 10.

Figure 8:
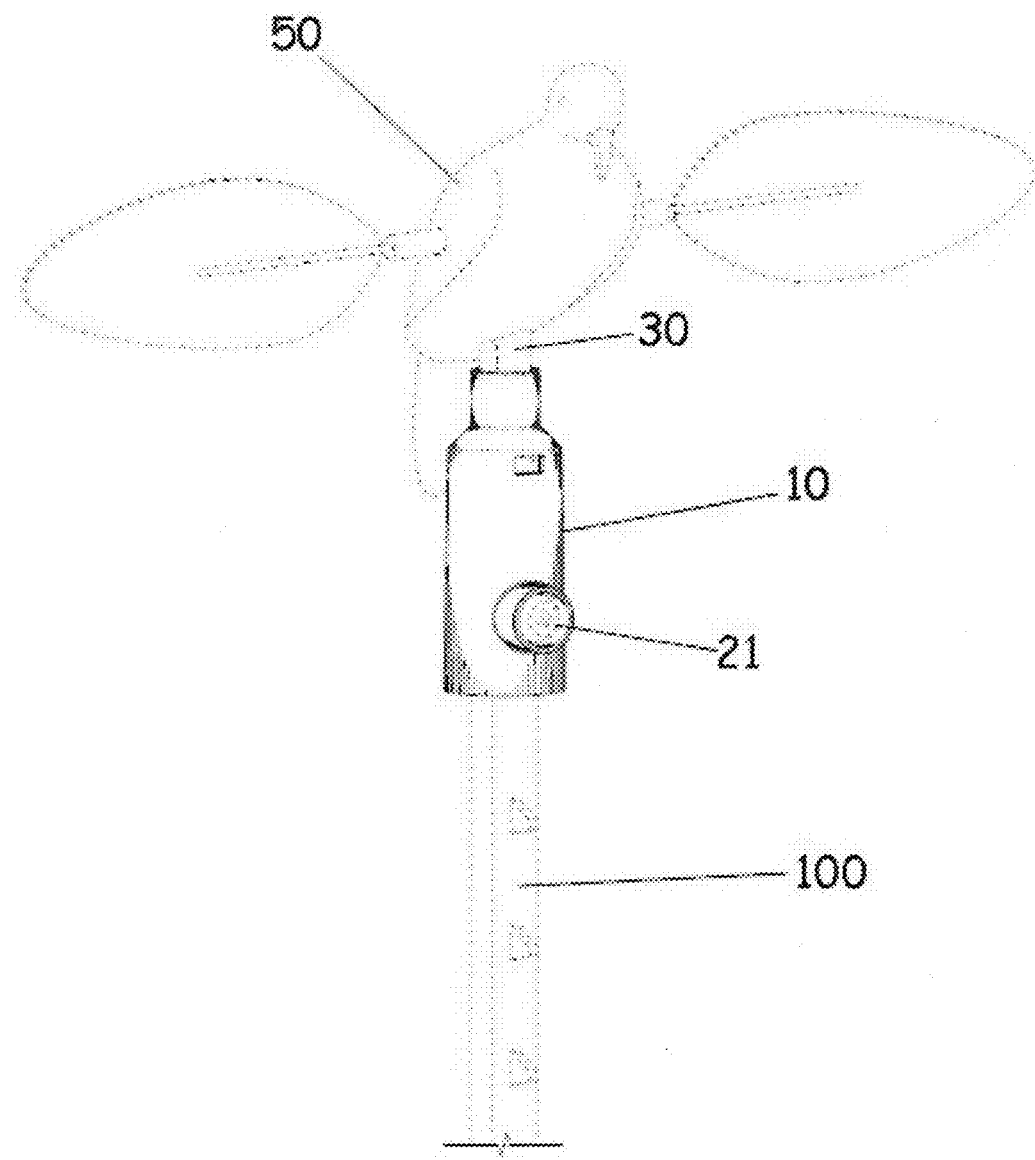
FIG. 8 is a perspective view of an embodiment of the mounting device secured to a T-post and holding a bird decoy in an operable position.

It is further contemplated that the mounting device 10 may serve as a means for securing a trail camera to a post 100 or like object. In one suitable embodiment, a trail camera may be secured to the mounting device 10 via two or more zip ties, such as metal zip ties including, but not necessarily limited to stainless steel zip ties. In an embodiment where the mounting device is attached to a support structure in an upright position as shown in FIG. 8, at least one zip tie is wrapped around the mounting device 10 above the tamper proof lock 18 and at least one zip tie is wrapped around the mounting device 10 below the tamper proof lock 18 to prevent the trail camera from being slid off of the mounting device 10.

For purposes of this application, the mounting device 10 is not necessarily limited to any one particular material of construction. However, construction materials may depend on the intended use and/or location of the mounting device 10. Suitably, the mounting device 10 is constructed from one or more materials including, but not necessarily limited to materials resistant to chipping, cracking, and breaking as a result of ozone, weathering, heat, moisture, other outside mechanical and chemical influences, as well as violent physical impacts of varying forces at varying speeds. Suitable materials include, but are not necessarily limited to composite materials, plastics, rubbers, ferrous metals, non-ferrous metals, and combinations thereof.

In one particularly advantageous embodiment, the mounting device 10 is constructed from plastic. In another particularly advantageous embodiment, the mounting device 10 is constructed from aluminum. In another particularly advantageous embodiment, the mounting device 10 is constructed from stainless steel. Both plastic and metal mounting devices 10 may be formed from molds. In another embodiment, plastic and metal mounting devices 10 may be pieced together. For example, metal mounting devices 10 may be mig-welded together.

The mounting device 10 may also comprise an outer protective layer as desired. For example, a mounting device 10 constructed from metal may have an outer coating of paint, for example, a powder coat. In another embodiment, the mounting device 10 may comprise an outer rubber layer. The mounting device 10 may also comprise a camouflage pattern. Furthermore, the mounting device 10 may also be configured to have a camouflage pattern or true-to-life color scheme for enhancing the effect of the decoy attached thereto.

The invention will be better understood with reference to the following non-limiting example, which is illustrative only and not intended to limit the present invention to a particular embodiment.

Example 1

Figure 9:
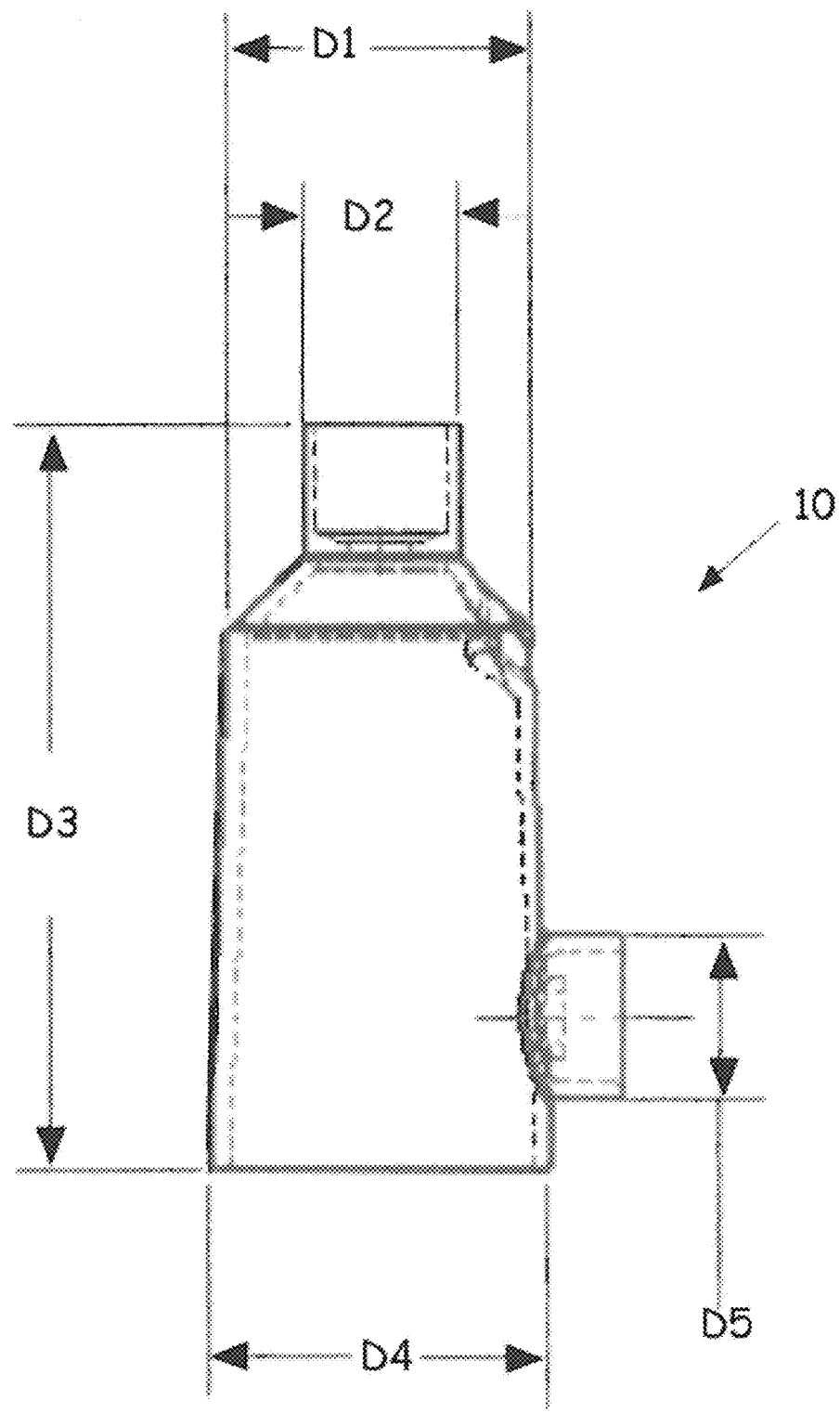
FIG. 9 is a right side elevational view of an embodiment of the mounting device.

In a first non-limiting example, a mounting device 10 is provided for securing a MOJO Mallard® duck decoy to a pre-existing T-Post 100 of a barbed wire fence. With reference to FIG. 9, the mounting device 10 includes the following dimensions:

D1: about 5.083 cm (2.001 inches)
D2: about 2.642 cm (1.040 inches)
D3: about 12.70 cm (5.000 inches)
D4: about 5.725 cm (2.254 inches)
D5: about 2.558 cm (1.007 inches)

Persons of ordinary skill in the art will recognize that many modifications may be made to the present application without departing from the spirit and scope of the application. The embodiment(s) described herein are meant to be illustrative only and should not be taken as limiting the invention, which is further defined in the following paragraphs.

A device for securing a hunting decoy to a support structure comprising:

a first surface for mating with the support structure; and
a second surface for mating with the hunting decoy;
wherein the second surface is operationally configured to include a minimum surface area for supporting the decoy.

A device for securing a hunting decoy to a support structure comprising:
a first surface for mating with the support structure;
a second surface for mating with the hunting decoy; and
a tamper proof lock for securing the device to the support structure;
wherein the second surface is operationally configured to include a minimum surface area for supporting the decoy.

A device for securing a hunting decoy to a support structure comprising:
a first surface for mating with the support structure; and
a second surface for mating with the hunting decoy;
wherein the second surface includes a stepped inner surface.

A device for securing a hunting decoy to a support structure comprising:
a first surface for mating with the support structure;
a second surface for mating with the hunting decoy; and
a tamper proof lock for securing the device to the support structure;
wherein the second surface includes a stepped inner surface.

A device for securing a hunting decoy to a support structure comprising:
a first surface for mating with the support structure;
a second surface for mating with the hunting decoy;
a clip slot for receiving an attachment clip;
a tamper proof lock for securing the device to the support structure;
wherein the second surface includes a stepped inner surface.

A device for securing a hunting decoy to a support structure comprising:
a first surface for mating with the support structure; and
a second surface for mating with the hunting decoy;
wherein the second surface includes a stepped inner surface comprising one or more friction reducing agents.

A method for attracting a bird to a particular area, comprising:
providing a device for securing a hunting decoy to a support structure, the device including (1) a first surface for mating with the support structure, and (2) a second surface for mating with the hunting decoy, wherein the second surface is operationally configured to minimize the surface friction with the decoy in abutment therewith;
providing an upright post at a particular area;
mating the first surface of the device to the exposed end of the post; and
attaching a desired hunting decoy to the second surface.

A method for attracting a bird to a particular area, comprising:
providing a device for securing a hunting decoy to a support structure, the device including (1) a first surface for mating with the support structure, (2) a second surface for mating with the hunting decoy, and (3) a tamper proof lock, wherein the second surface is operationally configured to minimize the surface friction with the decoy in abutment therewith;
locating a desired pre-existing T-post at a particular area;
mating the first surface of the device to the exposed end of the T-post;
securing the device to the T-post via the tamper proof lock; and
attaching a desired hunting decoy to the second surface.

A device for securing a hunting decoy to a support structure comprising:
a first surface for mating with the support structure; and
a second surface for mating with the hunting decoy;
wherein the second surface includes a contoured inner surface.

A device for securing a hunting decoy to a support structure comprising:
a first surface for mating with the support structure; and
a second surface for mating with the hunting decoy;
wherein the second surface includes a beveled inner surface.

A device for securing a hunting decoy to a support structure comprising:
a first surface for mating with the support structure;
a second surface for mating with the hunting decoy;
a clip slot for receiving clothespin;
a tamper proof lock for securing the device to the support structure;
wherein the second surface includes a stepped inner surface.

The device of the previous paragraph wherein the clothespin includes a metal clothespin.

The device of the previous paragraph wherein the metal clothespin includes a steel clothespin.

A device for securing a hunting decoy to a support structure comprising:
a first surface for mating with the support structure;
a second surface for mating with the hunting decoy;
a clip slot for receiving steel clothespin;
a tamper proof lock for securing the device to the support structure;
wherein the second surface includes a contoured inner surface.

I claim:

1. A post mounting device for securing a hunting decoy to a post comprising an elongated body having:
a longitudinal axis;
an outer surface;
a first surface for mating with the post;
a second surface for mating with a peg of the hunting decoy, said peg comprising a rounded edge; and,
wherein the second surface comprises a step, and where said step comprises a sharp edge that interfaces with said rounded edge of the peg during mounting of the decoy to minimize a contact surface between the second surface and the peg of the decoy.

2. The device of claim 1 further comprising a tamper proof lock for securing the device to the support structure.

3. The device of claim 2 further comprising a clip slot for receiving an attachment clip.

4. The device of claim 1 wherein said step comprises one or more friction reducing agents.

5. The device of claim 1 further comprising a slot for receiving a clothespin.

6. The device of claim 5 wherein the clothespin includes a metal clothespin.

7. The device of claim 6 wherein the metal clothespin includes a steel clothespin.

* * * * *